July 30, 1968  L. FRITZ ETAL  3,394,807
MAGNETIC SEPARATING APPARATUS
Filed Dec. 15, 1965  5 Sheets-Sheet 1

INVENTORS:
LOTHAR FRITZ, RÜDIGER FRITZ
BY Michael J. Striker
ATTY

July 30, 1968    L. FRITZ ET AL    3,394,807
MAGNETIC SEPARATING APPARATUS
Filed Dec. 15, 1965                    5 Sheets-Sheet 2

INVENTORS:
LOTHAR FRITZ, RÜDIGER FRITZ
BY
Michael J. Striker
Atty

July 30, 1968 L. FRITZ ETAL 3,394,807
MAGNETIC SEPARATING APPARATUS
Filed Dec. 15, 1965 5 Sheets-Sheet 3

INVENTORS:
LOTHAR FRITZ, RÜDIGER FRITZ
BY
Michael J. Striker

July 30, 1968  L. FRITZ ET AL  3,394,807
MAGNETIC SEPARATING APPARATUS
Filed Dec. 15, 1965  5 Sheets-Sheet 4

INVENTORS:
LOTHAR FRITZ, RÜDIGER FRITZ
BY
Michael S. Striker
ATTY

United States Patent Office 3,394,807
Patented July 30, 1968

3,394,807
MAGNETIC SEPARATING APPARATUS
Lothar Fritz, Cologne, and Rüdiger Fritz, Sindorf, near Horrem, Germany, assignors to Steinert Elektromagnetbau, Cologne-Braunsfeld, Germany
Filed Dec. 15, 1965, Ser. No. 514,016
Claims priority, application Germany, Dec. 22, 1964, F 44,779
20 Claims. (Cl. 209—219)

ABSTRACT OF THE DISCLOSURE

A magnetic separating apparatus has means for producing a primary magnetic field, and a separator which includes a magnetizable body permeated by the primary magnetic field, and a plurality of flux generating elements, either windings or permanent magnets, mounted on the magnetizable body for producing a plurality of secondary magnetic fields superimposed on the primary magnetic field so that in axial direction of the separator means, variations of the magnetic potential and flux intensity are produced. Either the magnetizable body, or a drum surrounding the same is rotated so that the magnetic components of a substance passing the separator means are attracted by successive surface portions of the same.

---

The present invention relates to magnetic separating apparatus, and more particularly to magnetic separating apparatus including a rotary magnetic separator for separating magnetic components of a mixture of solid particles, or of a suspension.

In magnetic separating apparatus of this type, the magnetic separating force is proportional to the flux intensity and to its gradient. Therefore, the flux intensity and particularly its gradient, must be as great as possible if only weakly magnetizable components of a substance are to be separated.

A magnetic separating apparatus according to the prior art comprises two poles forming an air gap, one of the poles being constituted by a rotary or stationary cylinder of a magnetizable material. In the latter construction, a rotary drum consisting of a non-magnetizable material surrounds the magnetizable cylinder. A high flux intensity can be obtained only by the use of closed magnetic circuits in which the magnetizable cylinder is excited by the magnetic field to form secondary magnetic poles.

A disadvantage of the constructions according to the prior art resides in that only a part of the magnetic field passes through the magnetizable cylinders, while the magnet yoke is passed by the entire magnetic flux, and must be dimensioned so that the substantial stray flux does not produce a great loss of magnetic potential in the magnetic circuit.

Another disadvantage of the prior art construction, is the substantially homogeneous magnetic field in the air gap. It is known to those skilled in the art that a non-homogeneous magnetic field produces a better separation, and it has been proposed to use cylinders of different diameters, air gaps of varying widths, sharp projecting ridges and grooves on the cylinder surface, cross grooves in the poles, and other measures to obtain a non-homogeneous magnetic field.

In certain prior art constructions in which opposing poles alternate to produce the magnetic field, pairs of opposing poles form a zone in which the magnetic potential is substantially zero.

It is one object of the invention to overcome the disadvantages of prior art constructions of magnetic separating apparatus, and to provide a magnetic separating apparatus producing the desirable great flux intensity, but rendering the magnetic field non-homogeneous.

Another object of the invention is to produce in the air gap of a magnetic separating apparatus, a magnetic field which is non-homogeneous in flux direction and in transverse directions.

Another object of the invention is to provide a magnetic separating apparatus in which the heavy and space consuming magnetic yoke of prior art apparatus is replaced by light and compact magnetizable members.

Another object of the invention is to produce a non-homogeneous magnetic field by superimposing on a homogeneous magnetic field of high flux intensity, a plurality of secondary magnetic fields of smaller potential for producing variations of the magnetic potential in the magnetic field.

With these objects in view, the present invention relates to an improvement of magnetic separating apparatus for the purpose of separating magnetic components of a substance, such as a mixture of solid particles or a suspension.

One embodiment of the invention comprises magnetic means for producing a primary magnetic field; at least one separator means including a magnetizable means permeated by the primary magnetic field, and a plurality of flux generating elements mounted on the magnetizable means spaced along the axis of the same for producing a plurality of secondary magnetic fields superimposed on the primary magnetic field for producing variations of the magnetic potential in adjacent axial zones; and drive means for rotating at least the peripheral part of the separator means.

In one embodiment of the invention, the separator means includes a rotary magnetizable cylindrical core which is rotated and carries narrow axially spaced annular windings energized so that adjacent windings produce opposite secondary magnetic field portions. In another embodiment of the invention, the cylindrical core is constructed in the same manner, but is stationary and surrounded by a non-magnetizable drum which is rotated so that the magnetic components separated from a substance passing the drum adhere to the same. In another embodiment of the invention, permanent magnets are secured to the magnetizable core and surrounded by a non-magnetizable drum.

Another embodiment uses coils on the rotary magnetizable core for producing the primary magnetic field which passes through a magnetizable member extending along the rotary separator means and forming an air gap for the substance with the same. However, the exciting coils may also be mounted on the magnetizable member for producing the primary magnetic field. The primary magnetic field may also be produced by coils and a rotary magnetizable member which forms an air gap with a rotary separator means. A great number of modifications of the basic concept of the present invention is possible, and the present invention is particularly characterized by the following features:

A. The separator means are not secondary magnets induced by a primary magnetic field, but have independent elements, either windings or permanent magnets, with small pole division, which produce secondary magnetic fields superimposed on the primary magnetic field to transform the substantially homogeneous primary field into a composite non-homogeneous field which still has the high magnetic potential and flux intensity of the primary magnetic field. In accordance with the invention, the secondary field is substantially weaker than the primary magnetic field, and is produced by closely spaced elements, which preferably are spaced only a few millimeters from each other, and have alternately different magnetic polarity. The thus produced secondary magnetic field produces alternately stronger and weaker portions of the primary field, which are so dimensioned that all points of the composite field in axial direction of the separator means, have a magnetic potential of the same polarity, but varying in intensity. The result of the superimposition of the smaller secondary field on the higher primary field is a very non-homogeneous magnetic field in the air gap through which the substance to be separated passes, while the field intensity is maintained very high, and has a high gradient. The tangential components of the field intensity produce movement of the magnetized separated particles parallel to the axis of the separator means so that the release and discharge of non-magnetic particles of the substance is improved.

B. In the embodiment in which a stationary magnetizable means and a plurality of elements producing a plurality of secondary magnetic fields, are surrounded by a thin-walled rotary drum consisting of a non-magnetizable material, the elements which produce the secondary magnetic fields are constructed as explained in section A. In one embodiment of the invention, the stationary magnetizable means is a cylinder having a magnetizable peripheral portion provided with transverse grooves or slots having a strong additional effect to render the primary magnetic field non-homogeneous.

Another aspect of the present invention is the combination of the above described separator means with a three pole magnetic means for producing the primary magnetic field. The magnetic means for producing the primary magnetic field include exciting coils advantageously provided at the ends of the separator means, rotatable with the same, or mounted on magnetizable means which may be stationary or rotatable and form an axially extending air gap with the separator means. The magnetic circuit can be closed in different ways, as follows:

(a) A three-pole magnetic system with counter polarity,
(b) A solid cylinder consisting of a magnetizable material having a smooth surface having a center portion forming the middle pole of a three pole magnetic system, and having end portions carrying exciting coils for producing the primary magnetic field,
(c) A three-pole fixed ferromagnetic member carrying at least some of the coils for producing the primary field, and having a center portion forming with a separator means the air gap through which the substance to be separated into components passes,
(d) A fixed concave ferromagnetic magnetizable armature without distinct poles which extends over at least part of the width of the three-pole system, and
(e) The air in open magnetic circuits.

All constructions of the invention are extremely compact and require a small amount of magnetizable material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5a is a cross sectional view taken on line Va—Va in FIG. 4a;

FIG. 7 is a schematic side elevation illustrating one embodiment of a magnetic separating apparatus according to the invention including a separator means as shown in any one of FIGS. 1 to 4 and 4a;

Figure 7:
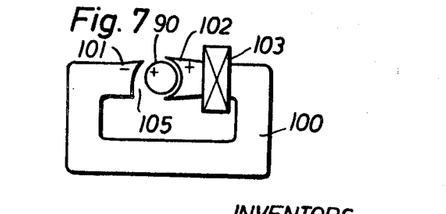
Figure 7A:
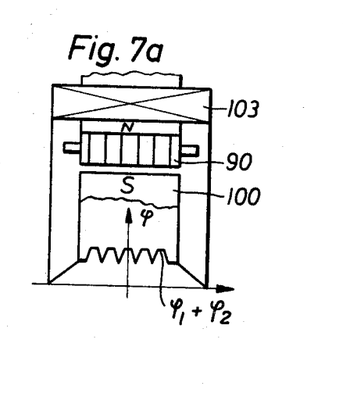
FIG. 7a is partially a plan view of the embodiment of FIG. 7, and partially a diagram illustrating the magnetic potential along the separator means.

Referring now to the drawing, and more particularly to FIGS. 7 and 7a, magnetic means for producing a primary magnetic field are shown to include a magnetizable core member 100 with opposite poles 101 and 102 and carrying a coil 103 through which electric current flows for producing a primary magnetic field in core member 100 and in the space between the poles. The primary magnetic field flows through a cylindrical separator means 90 which produces secondary opposite magnetic fields, as will be explained hereinafter, which are superimposed in the air gap 105 on the primary magnetic field. If a substance containing a magnetic component passes through air gap 105, the magnetic component adheres to the outer peripheral part of separator means 90, and is removed from the same by suitable means, not shown.

FIGS. 1, 2, 3, 4 and 4a illustrate different embodiments and constructions of a separator means 90, any of which may be used in a magnetic separating apparatus as shown in FIG. 7, or in any other magnetic separating apparatus according to the present invention.

Figure 1:
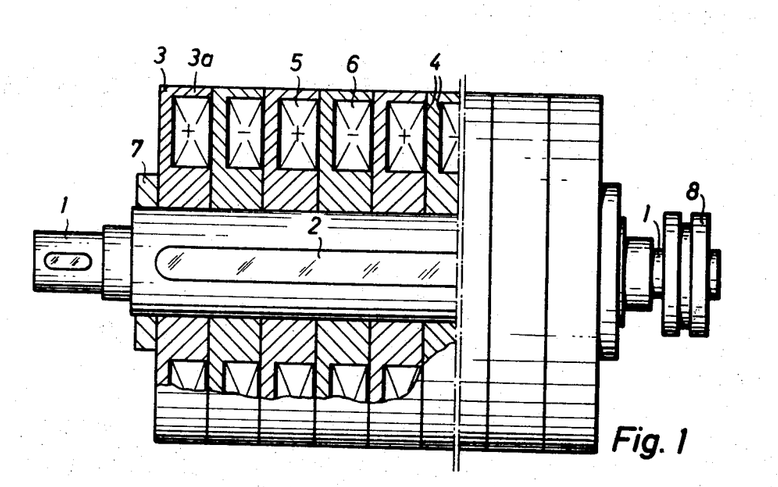
FIG. 1 is a plan view, partially in section, illustrating a first embodiment of a separator means according to the invention.

Referring now to FIG. 1, a rotary drive shaft 1 has a key groove for securing a plurality of annular disks 3 by means of a key to drive shaft 1. End members 7 secure disks 3 against axial movement on shaft 1. Each disk 3 has an annular recess 3a inwardly of the peripheral wall portion thereof, each recess being open on one side and closed by an annular radial wall portion of the next following disk. Disks 3 consist of a magnetizable material, for example, Armco iron, 30% Co-steel, or another magnetizable metal. Flat annular windings 5 and 6 are supplied with electric current through slide rings 8 on shaft 1 and brushes, not shown, and are arranged to supply current to the windings which are flux generating elements wound to produce opposing secondary magnetic fields in axial direction of the separator means. Each winding may consist of eloxadized aluminum band or of a copper band. Annular insulating members 4 are located on opposite sides of each winding 5 or 6, and may consist of an insulating material impregntated with a resin.

Figure 2:
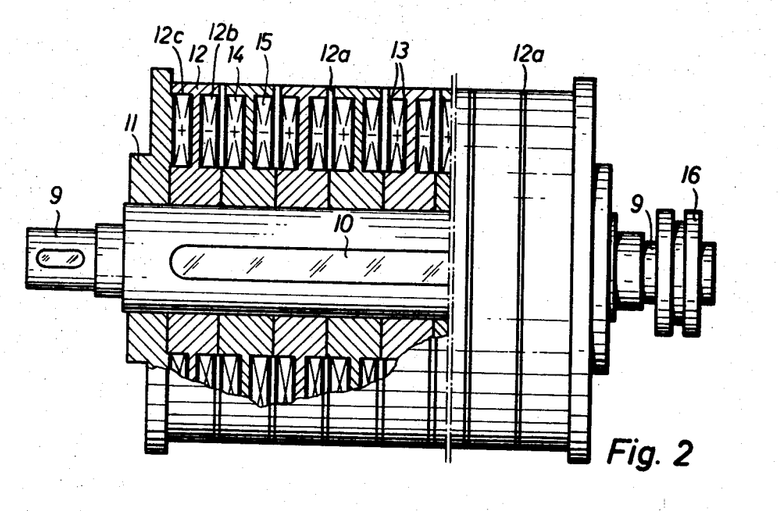
FIG. 2 is a plan view, partially in section, illustrating a modification of the embodiment of FIG. 1.

The modified separator means shown in FIG. 2 is constructed in substantially the same manner and includes a drive shaft 9 with a key groove 10, a plurality of disks 12 secured by a key to drive shaft 9 and held in place by axial end members 11. Current is supplied through slide rings 16 to a plurality of annular windings 14 and 15. Each disk 12 has on opposite lateral faces annular recesses 12b and 12c for receiving windings 14 and 15 for producing opposite secondary magnetic fields. Between each pair of adjacent windings of two adjacent disks, an annular insulating wall 12a is provided which extends to the peripheral outer surface of the separator means.

In the embodiments of FIGS. 1 and 2, each winding indicated by a plus sign produces in an axial zone of the separator means, a positive secondary magnetic field which is added to the primary magnetic field produced, for example, by magnetizable member 100 and winding 103, while each winding indicated by minus sign produces an opposite secondary magnetic field reducing the magnetic potential of the primary field in the respective narrow region.

Figure 6:
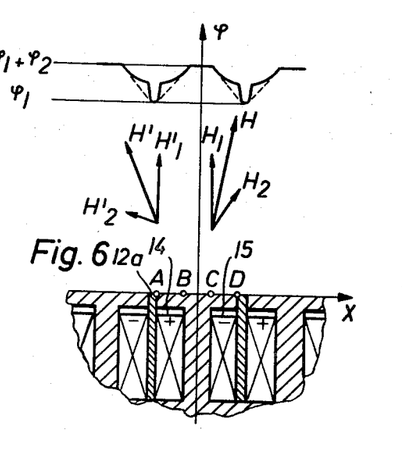
FIG. 6 is partly a sectional view illustrating a detail of the embodiment of FIG. 2, and partly a diagram illustrating variations of the magnetic potential together with vector diagrams indicating the field intensity of the magnetic field.

The lower portion of FIG. 6 shows a part of the embodiment of FIG. 2. In the upper portion, the constant potential $\varphi_1$ is indicated by a horizontal line. Each pair of windings 14, 15 add secondary magnetic field peaks $\varphi_2$ to the primary field so that the magnetic potential of the composite magnetic field is $\varphi_1+\varphi_2$. The broken lines illustrate the conditions for the embodiment of FIG. 1, but in the embodiment of FIG. 2, also shown in FIG. 6, where insulating walls 12a are provided between adjacent windings, the drop of the magnetic potential is delayed in a direction from B to A, and from C to D so that peaks are not only formed in the regions B and C, as in the embodiment of FIG. 1, but in the regions A, B, C, and D, as indicated in solid lines in the uppermost portion of FIG. 6. The peaks in the region D and A are less high than the peaks in the region B and C, but the composite magnetic field is even less homogeneous in the embodiment of FIG. 2 than in the embodiment of FIG. 1.

The vector diagrams in FIG. 6 illustrate the field intensities $H_1$ and $H_1'$ of a homogeneous primary magnetic field, and the field intensities $H_2$ and $H_2'$ of the field intensities of the secondary magnetic field in the gap adjacent point C and point A. The position and length of the resultant vectors, and the field intensities $H'$ and $H$ indicate the extent to which the magnetic field has been rendered non-homogeneous in the gap adjacent the separator means 90.

Figure 3:
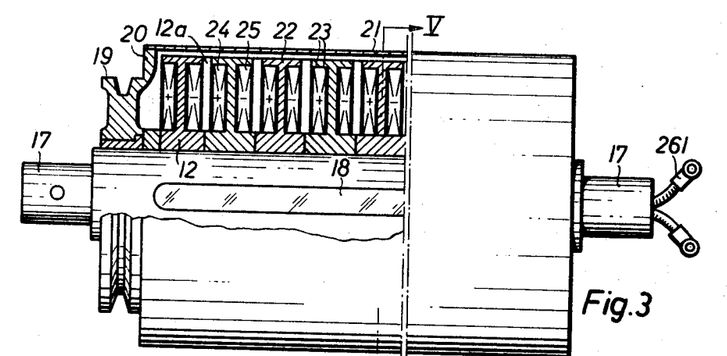
FIG. 3 is a plan view, partially in section, illustrating a second embodiment of the separator means of the invention.
Figure 4:
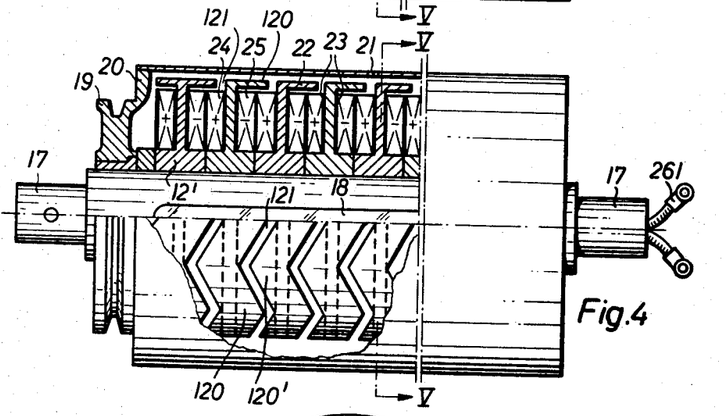
FIG. 4 is a plan view, partially in section, illustrating a modification of the embodiment of FIG. 3.
Figure 4A:
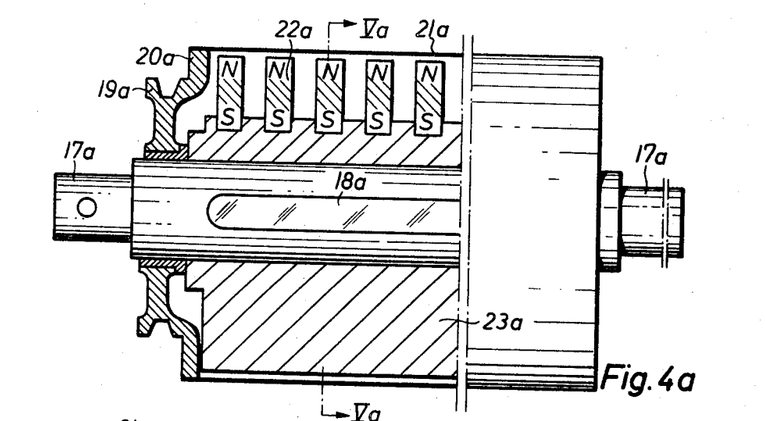
FIG. 4a is a plan view, partially in section, illustrating a third embodiment of the separator means according to the present invention.

The entire separator means of the embodiments of FIGS. 1 and 2 rotates in the primary field, produced, for example by the magnetic means 100 to 103. However, it is possible to use a separator means 90 in the primary field constructed as shown in FIGS. 3, 4 or 4a. In this embodiment of the separator means, the same includes a stationary part carrying the windings producing the secondary magnetic field, and a hollow drum surrounding the stationary part and being rotated, for example, in the space between poles 101 and 102. The outer drum 20, 21 in FIGS. 3 and 4, and 20a, 21a in the embodiment of FIG. 4a consists of a non-magnetizable material. A pulley portion 19 in the embodiment of FIGS. 3 and 4 and 19a in the embodiment of FIG. 4a serves as a drive means for rotating the drum on a shaft 17, or 17a respectively provided with a key groove 18, or 18a respectively. In the embodiment of FIG. 3, disks 12, as described with reference to FIG. 2 are secured to shaft 17, and opposite windings 24, 25 in annular recesses of the disks are alternately separated by magnetizable walls of the disks, and by non-magnetizable annular walls 12a. Annular insulating members 23 are located on opposite sides of each winding 24 or 25.

The construction corresponds to the embodiment of FIG. 2, but instead of rotating the magnetizable disks 12 with the winding, the same are held stationary, and only the outer drum 20, 21 is rotated so that successive peripheral portions of the drum are in contact with the substance passing through the separating gap.

The embodiment of FIG. 4 has adjacent magnetizable disks 12′ with windings 24 and 25 located in opposite recesses of each disk. Adjacent windings 24 are either separated by radial magnetizable walls of the disks, or by insulating members 23. The peripheral portions of the disks project transversely over part of a winding mounted in the adjacent disk, and portions 120, 120′ of adjacent disks 12′ form a zig-zag gap 121 extending in peripheral direction so that the composite magnetic field is rendered even more non-homogeneous. Current is supplied to the windings by conductors 261 passing through hollow shaft 17 and ducts in the disks, not shown.

Figure 5:
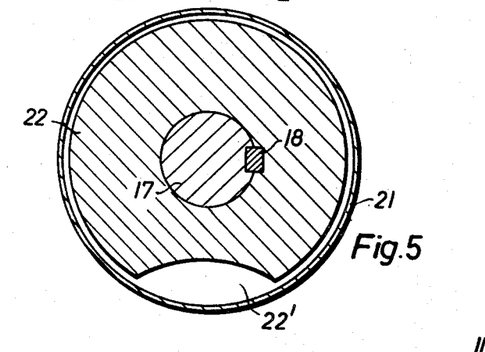
FIG. 5 is a cross sectional view taken on lines V—V in FIGS. 3 and 4.

It is advantageous to provide recesses 22′ in the walls 22 of the disks, as shown in FIG. 5 so that the magnetic particles adhering to the outer surface of drum 21 pass into a smaller magnetic field in the region 22′ and can be easily separated from the surface of drum 21 in the region of the recess 22′. The end portions 20, 19 of the drum are advantageously constructed of aluminum.

Figure 5A:
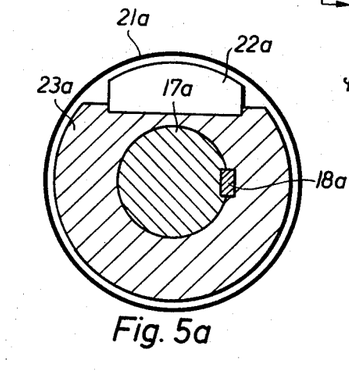

The embodiment illustrated in FIGS. 4a and 5a also uses a drum 19a, 20a, 21a consisting of a non-magnetizable material which is driven to rotate on shaft 17a. A magnetizable substantially cylindrical body 23a, which may consist of 30% Co-steel, is secured by key and groove 18a to shaft 17a, and held stationary with the same during rotation of drum 21a. The cylindrical body 23a is flattened on one side along a chord, and permanent flux generating magnets 22a are secured to this portion spaced from each other in axial direction, and having poles of the same polarity located adjacent each other. The outer ends of magnets 22a are spaced the same radial distance from the axis of shaft 17a as the cylindrical peripheral surface of the magnetizable body 23a, so that a uniform air gap is formed by drum 21a with the outer ends of the permanent magnets 22a and the outer peripheral surface of cylindrical body 23a. Assuming that the separator means shown in FIG. 4a is used in the separating apparatus shown in FIG. 7, the polarity of the permanent magnet is the same as the polarity of the primary field produced by magnetic means 100, 103. The spaced secondary magnetic fields produced by the permanent magnets 22a produce spaced peaks of the magnetic potential of the composite field produced by the primary and secondary magnetic fields.

Figure 8:
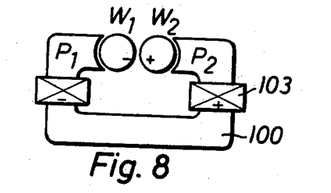
FIG. 8 is a schematic side elevation illustrating a modification of the embodiment of FIG. 7.

The magnetic separating apparatus according to the embodiment shown in FIG. 8 includes a magnetic yoke and windings 103 for producing a primary magnetic field between the pole shoes $P_1$ and $P_2$. In the space between the pole shoes, two separator means $W_1$, $W_2$ are located, each of which has the same polarity as the adjacent pole shoe with which it forms an air gap. Any separator means described with reference to FIGS. 1, 2, 3, 4 and 4a may be used.

Figure 9:
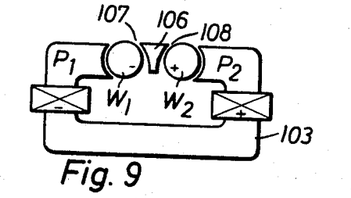
FIG. 9 is a schematic side elevation illustrating a modification of the embodiment of FIG. 8.

In the modification shown in FIG. 9, the magnetizable core means 103 include a core portion 106 located between two separator means. The downwardly widening gaps 107 and 108 are used for the passage of the substance from which a magnetizable component is to be separated. The magnetizable particles adhere to the revolving peripheral portions of the separator means $W_1$ and $W_2$ and are then removed from the same.

Figure 10:
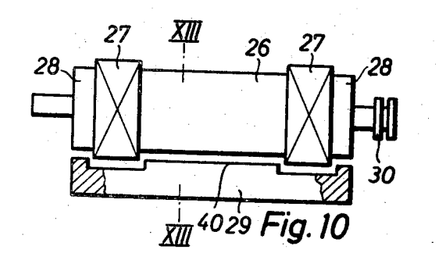
FIG. 10 is a fragmentary schematic plan view, partially in section, illustrating a second embodiment of the magnetic separating apparatus of the invention.
Figure 11:
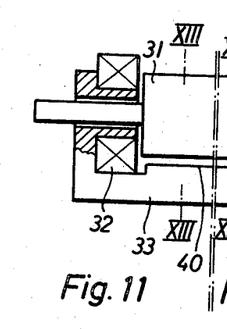
FIG. 11 is a fragmentary schematic plan view illustrating a modification of the magnetic separating apparatus shown in FIG. 10.
Figure 12:
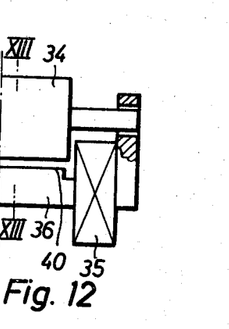
FIG. 12 is a fragmentary schematic plan view illustrating another modification of the separating apparatus shown in FIG. 10.

In the embodiment of FIG. 10, and its modification shown in FIG. 11 and FIG. 12, the flux of the primary magnetic field does not flow only in a direction transverse to the separator means, as in the embodiments of FIGS. 7 to 9, but flows transversely into the center portion of the separator means, and in opposite axial directions through the end portions of the same so that the separator means forms the middle pole of a three pole magnetic means producing the primary field. In the embodiment of FIG. 10, the magnetizable body of any of the separator means shown in FIGS. 1, 2, 3, 4, and 4a, has end portions 28 forming pole shoes for a pair of windings 27 producing the primary flux. Current is supplied to windings 27 through slide rings 30. Core means 29 including a magnetizable central pole shoe 40, extending in axial direction along the separator means 26 so that two magnetic circuits are formed.

Figure 13:
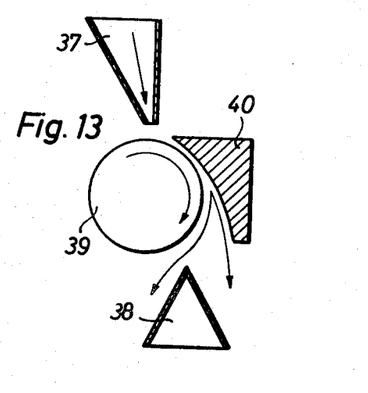
FIG. 13 is a fragmentary schematic cross sectional view taken on line XIII—XIII in FIGS. 10, 11 and 12.

As best seen in FIG. 13, pole shoe 40 forms a downwardly widening gap with the rotating peripheral portion of the separator means 39. The substance to be divided into magnetic and non-magnetic components is supplied through a hopper 37 to the gap, and guide means 38 at the wider end of the gap guide the magnetic components and the non-magnetic component into separate receptacles, not shown.

The primary windings 27 produce a very strong magnetic field between pole shoe 40 and the central separator portion 39 which is rendered non-homogeneous by the superimposed secondary fields of the magnetic windings or permanent magnets described with reference to FIGS. 1 to 4a.

A finely divided substance supplied to hopper 37 falls on the top surface of the movable peripheral portion of the separator means and is carried into the narrow end of the gap, either by the drum 21 or 21a, or by the peripheral surface of the rotating separator means described with reference to FIGS. 1 and 2. Magnetic or magnetizable particles of the substance are attracted by the separator means and gather in the regions where the field intensity is greatest. When the adhering magnetizable particles have passed the guide means 38, they are scraped off, for example by brushes, from the peripheral portion of the separator means, while the non-magnetic particles of the substance drop from the gap without being deflected by the magnetic field.

The modification shown in FIG. 11 corresponds in effect to the embodiment of FIG. 10. However, the windings 32 are mounted on opposite ends of substantially U-shaped core means, only one half of the construction being shown in FIG. 11. The flux passes again in axial direction into the end portions of the separator means 31, and in transverse direction through the pole shoe 40. In the modification of FIG. 12, windings 35 are mounted on opposite ends of the core portion 36 which extends parallel to the separator means 34. Only one half of the construction is shown in FIG. 12, and the other half is constructed in the same manner. FIG. 13 may be considered as cross section of the embodiments of FIGS. 11 and 12 since the pole shoe 40, the hopper 37, and the guide means 38 are in the same position in relation to the rotating central potrion 39 of the separator means.

Figure 14:
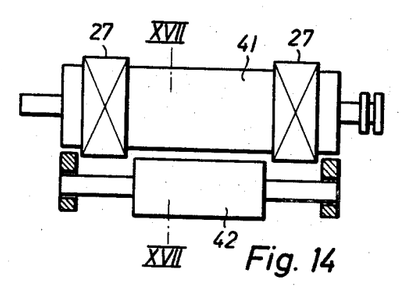
FIG. 14 is a fragmentary schematic plan view illustrating a third embodiment of the magnetic separating apparatus according to the invention.
Figures 15, 16:
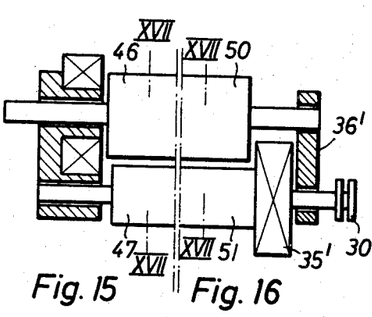
FIG. 15 is a fragmentary schematic plan view illustrating a modification of the embodiment of FIG. 14.
FIG. 16 is a fragmentary schematic plan view illustrating another modification of the embodiment of FIG. 14.
Figure 17:
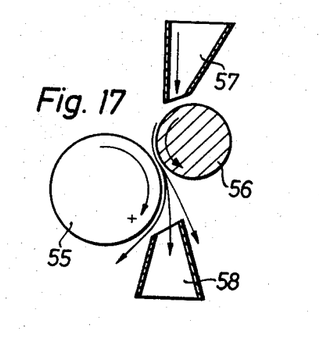
FIG. 17 is a fragmentary schematic cross sectional view taken on lines XVII—XVII in FIGS. 14, 15 and 16.

The embodiment of FIGS. 14 and 17, and its modifications shown in FIGS. 15 and 16 are similar to the embodiments shown in FIGS. 10 to 12, but instead of a stationary pole shoe 40, a rotary magnetizable drum 42 is provided in the embodiment of FIG. 14, a drum 47 in the embodiment of FIG. 15, and a drum 51 in the embodiment of FIG. 16, all drums being indicated by reference numeral 56 in FIG. 17.

The diameter of the solid magnetizable rotary member 42, 47, 51, 56 is preferably smaller than the diameter of the separator means 41, 46, 50, and 55 with which it forms an air gap for the substance to be divided. The magnetizable rotary member is preferably positioned slightly higher than the separator means so that on the surface first impinged by the substance supplied through hopper 57, the magnetic field intensity is lower than in the gap formed with the separator means. Consequently, highly magnetic particles are attracted by the rotary magnetizable member 56 in FIG. 17, while the particles of weaker magnetism are attracted by separator means 55 in FIG. 17 and adhere to the surface of the same. A pair of guide means 58 forms an inner passage for the non-magnetic particles of the substance, while the weaker and stronger magnetic components are removed from members 56 and 55 and deposited on opposite sides of guide means 58.

In the embodiment of FIG. 14, a pair of windings 27 is mounted at opposite ends of separator means 41 producing oppoite magnetic fields whose lines of force close through the rotary magnetizable member 42 and the central portion of separator means 41. In the embodiment of FIG. 15, windings are mounted on stationary core means at opposite ends of the separator means 46. Only half of the construction is shown, and the other half is identical with the illustrated portion. In the embodiment of FIG. 16, a winding 35' is mounted at either end of the magnetizable member 51, and rotates with the same while producing the primary magnetic field. Two magnetic circuits are formed by separator means 50, rotary magnetizable member 51, and magnetizable member 36' in which the shafts of the separator means and of the magnetizable rotary member 51 are mounted. Current is supplied to winding 35' through slide rings 30.

Figure 18:
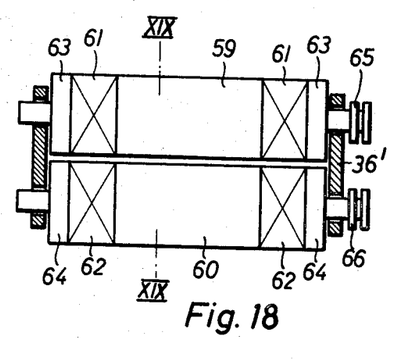
FIG. 18 is a fragmentary schematic plan view illustrating another embodiment of a magnetic separating apparatus according to the invention including two separator means.
Figure 19:
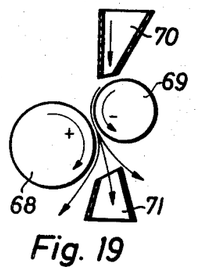
FIG. 19 is a fragmentary schematic cross sectional view taken on line XIX—XIX in FIG. 18.

In the embodiment of the magnetic separating apparatus illustrated in FIGS. 18 and 19, the rotary magnetizable core member is replaced by a second separator means, as disclosed with reference to any of FIGS. 1, 2, 3, 4, and 4a. A three-pole magnetic system with counter polarity is again provided. The rotary peripheral central portions 68 and 69 of two separator means 59 and 60 form an air gap, as best seen in FIG. 19. A substance is supplied through hopper 70, and below the air gap, a pair of guide means 71 is provided.

The rotary magnetizable means of separator means 59, 60 are surrounded at the ends thereof by windings 61 and 62, forming pole shoes 63, 64 at the ends of the separator means. Magnetizable members 36' support the shaft end portions of the separator means for rotation, assuming that one of the embodiments of FIGS. 1 and 2 is used. If separator means with rotary drums are used, the latter are mounted for rotation in magnetizable member 36'.

In any event, a primary flux is produced by windings 61 and 62 which forms two magnetic circuits, with flux portions joining in the region of the center portions of the separator means to flow in transverse direction in relation to the axes of the same. The primary field is rendered non-homogeneous by the narrow secondary field portions produced by windings 5, 6 or 14, 15.

The substance dropping onto the upper peripheral portion of the higher separator means is subjected to a weaker composite field, and consequently, the highly magnetic particles adhere to the periphery of portion 69. Particles of lesser magnetism adhere to the surface of separator means 68 whose polarity is opposite to the polarity of separator means 69, as indicated by plus and minus signs. The non-magnetic part of the substance falls into the passage between the guide means 71, while the two magnetic components are scraped off from the separator means, and fall on opposite sides of guide means 71 into suitable receptacles.

Figure 20:
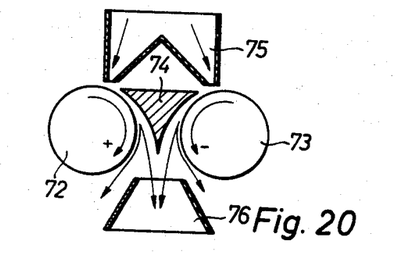
FIG. 20 is a fragmentary schematic cross sectional view taken on line XIX—XIX in FIG. 18 and illustrating a modification of the embodiment of FIG. 19.

The modification of the embodiment of FIGS. 18, 19 shown in FIG. 20 provides a core portion 74 between two separator means 72, 73 of opposite polarity. A pair of hoppers 75 supplies the substance to both separator means 72 and 73, so that the substance passes through two air gaps formed between the same and the core member 74. The non-magnetizable components fall between the two guide means 76 into a passage, while the magnetic particles contained in the substance are attracted by separator means 72 and 73, carried beyond the guide means 76 and removed by suitable brushes. The arrangement of coils 61, 62 on the ends of the separator means is the same as described with reference to FIG. 18. Of course, it is also possible to mount the coils stationarily, as described with reference to FIG. 15.

Figure 21:
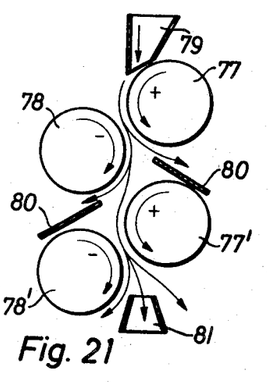
FIG. 21 is a fragmentary schematic front elevation illustrating another embodiment of a magnetic separating apparatus according to the invention.

In the embodiment of FIG. 21, a pair of separator means as described with reference to FIGS. 18 and 19, is combined with another pair of separator means.

A pair of upper separator means 77, 78, which may be constructed as described with reference to any one of FIGS. 1, 2, 3, 4, or 4a is separated by a pair of guide means 80 from a pair of lower separator means 77', 78' according to any embodiment of the invention. Coils 61, 62 may be provided on the separator means for producing the primary flux between the separator means of each pair, or stationary coils as shown in FIG. 15 may be used. The separator means 77, 77' are located slightly higher than the associated separator means 78, 78'.

The coils of separator means 77, 78, 77' and 78' are energized in such a manner that the primary field of each separator means is higher than the primary field of the separator means located above the same so that the magnetic field of separator means 77 is the lowest, and the magnetic field of separator means 78 is the highest. Only the highly magnetic particles of a substance supplied through hopper 79 are attracted by the nonhomogeneous magnetic field in the region of separator means 77 and adhere to the same so that they are transported beyond the region of guide means 80 where they are removed from separator means 77. Particles of somewhat lesser magnetism are attracted by separator means 78 and carried to the region of the respective guide means 80, where they are removed. The remaining substance falls into the gap between separator means 77' and 78', where remaining more magnetic particles are attracted by separator means 77', and less magnetic particles are attracted by separator means 78' and carried to opposite sides of guide means 81, while the non-magnetic component of the substance drops into a passage between the pair of guide means 81. It will be seen that the substance is divided into five parts, of which four are magnetic, and may be combined again, as desired.

Figure 22:
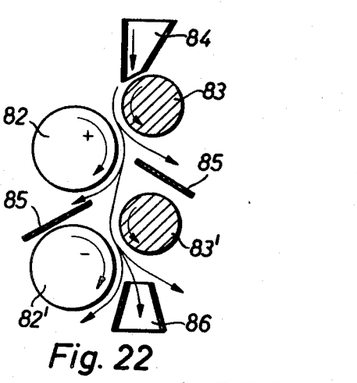
FIG. 22 is a fragmentary schematic front view, partially in section, illustrating a further embodiment of a magnetic separating apparatus according to the invention.

The embodiment illustrated in FIG. 22 uses two of the embodiments of FIGS. 14, 15 or 16 in sequence in the manner described for the embodiment of FIG. 21. A separator means 82, which may correspond to separator means 41, 46 or 50 is located higher than a corresponding separator means 82', and forms an air gap with a rotary magnetizable member 83, a corresponding rotary magnetizable member 83' forming an air gap with separator means 82'. Guide means 85 are located between the separator means and the rotary magnetizable members, respectively. A hopper 84 is located above the highest rotary magnetizable member 83, and a pair of guide means 86 forming a passage is located below the air gap formed by separator means 82' and rotary magnetizable member 83'. Stationary or rotary coils for producing a primary field, as described with reference to FIGS. 14, 15 and 16, are provided, but not shown in FIG. 22. The two separator means 82, 82' have opposite polarity. The solid magnetizable rotary members 83, 83' attract the particles which are more highly magnetic than the particles attracted by separator means 82, 82'. Two magnetic components are obtained on opposite sides of guide means 85, another two magnetic components on opposite sides of guide means 86, and a non-magnetic component falls into the passage between guide means 86.

It will be understood that each of the elements described above, or two or more together, may also find a useful application in other types of magnetic separating apparatus differing from the types described above.

What is claimed as new and desired to be secured by Letters Patent is:

1. Magnetic separating apparatus comprising, in combination, magnetic means for producing a primary magnetic field; at least one separator means having a main axis and including a magnetizable means permeated by said primary magnetic field, and a plurality of flux generating elements mounted on said magnetizable means spaced along said axis for producing a plurality of secondary magnetic fields superimposed on said primary magnetic field for producing axial zonal variations of the magnetic potential; and drive means for rotating at least the peripheral part of said separator means about said axis so that magnetic components of a substance passing said separator means are attracted by successive surface portions of the same.

2. Magnetic separating apparatus according to claim 1 wherein said drive means are connected with said magnetizable means for rotating the same with said elements about said axis.

3. Magnetic separating apparatus according to claim 1 wherein said magnetizable means includes a magnetizable cylindrical core, and wherein said elements are narrow axially spaced annular windings for an electric current, adjacent windings being wound on said core so as to produce opposite secondary magnetic field portions.

4. Magnetic separating apparatus according to claim 3 wherein said magnetizable core has radial annular magnetizable wall portions located between at least some adjacent windings of said windings.

5. Magnetic separating apparatus according to claim 4 wherein said magnetizable means includes radial annular wall portions consisting of a non-magnetizable material and located between other adjacent windings of said windings.

6. Magnetic separating apparatus according to claim 1 wherein said peripheral part of said separator means is a drum of a non-magnetizable material surrounding said magnetizable means and being rotated by said drive means about said axis, said magnetizable means being stationary.

7. Magnetic separating apparatus according to claim 6 wherein said elements are stationary permanent magnets arranged in an axial row.

8. Magnetic separating apparatus according to claim 7 wherein said magnetizable means is a cylindrical core having a given radius in relation to said axis and a peripheral portion flat along a chord; and wherein said permanent magnets are mounted on said portion and have outer poles of like polarity having said given radius; and wherein said drum has an inner surface closely spaced from said cylindrical core and said outer poles.

9. Magnetic separating apparatus according to claim 1 wherein said magnetic means includes a core member with opposite magnetic poles located on opposite sides of a space; and an exciting coil on said core member; and wherein said separator means are located in said space forming air gaps with said poles.

10. Magnetic separating apparatus according to claim 1 wherein said magnetic means include coil means energized by electric current, and core means permeated by said primary magnetic field and extending in axial direction along said separator means forming an air gap with said separator means for the passage of said substance.

11. Magnetic separating apparatus according to claim 10 wherein said coil means are mounted on said magnetizable means; and wherein said magnetizable means include pole shoes at the axial ends thereof and located in the regions of axial end portions of said core means so that said primary magnetic field passes through said magnetizable means, said poles shoes, said core means, and said air gap.

12. Magnetic separating apparatus according to claim 10 wherein said core means include a rotary magnetizable member having an axis of rotation parallel with said axis, and being driven by said drive means.

13. Magnetic separating apparatus according to claim 12 wherein said coil means include a coil mounted on said rotary magnetizable member.

14. Magnetic separating apparatus according to claim 13 wherein said coil means include a coil mounted on said magnetizable means of said separator means.

15. Magnetic separating apparatus according to claim 10 including another separator means having an axis parallel to said separator means; and wherein said core means include a core portion located between said two separator means and forming two air gaps with the same for passage of said substance.

16. Magnetic separating apparatus according to claim 1 comprising another separating means including a magnetizable means and elements for producing secondary magnetic fields, said two separating means being disposed to form an air gap for passage of said substance and extending in axial direction, and said secondary magnetic fields produced by said elements being of different polarity.

17. Magnetic separating apparatus according to claim 16 including a magnetizable member located between said separator means and forming two air gaps with the same for passage of said substance.

18. Magnetic separating apparatus according to claim 16 and comprising two other separator means producing secondary magnetic fields of different polarity and forming another air gap, said other air gap being located below said first mentioned air gap so that said substance passes successively through said air gaps, and including guide means for said substance located below each of said separator means.

19. Magnetic separating apparatus according to claim 1 wherein said magnetic means include two rotary magnetizable members rotated by said drive means; and comprising another separator means having a magnetizable means and elements for producing secondary magnetic fields of different polarity than said first mentioned separator means, said separator means being respectively disposed opposite said magnetizable members and forming air gaps with the same, said air gaps being disposed for successive passage of said material in downward direction.

20. Magnetic separating apparatus according to claim 1 and including a magnetizable means in said primary magnetic field extending along said separator means in axial direction and forming an air gap with the same for the passage of said substance.

References Cited

UNITED STATES PATENTS

| | | | |
|---|---|---|---|
| 1,214,817 | 2/1917 | Osgood | 209—216 |
| 1,958,521 | 5/1934 | Payne | 209—219 |
| 2,745,549 | 5/1956 | Spodig | 209—219 |
| 2,832,471 | 4/1958 | Goltz et al. | 209—219 |
| 3,024,910 | 3/1962 | Palasvirta et al. | 209—219 |

FOREIGN PATENTS

| | | |
|---|---|---|
| 1,241,192 | 8/1960 | France. |

HARRY B. THORNTON, *Primary Examiner.*

TIM R. MILES, *Assistant Examiner.*